(12) United States Patent
Pollak

(10) Patent No.: US 7,040,186 B2
(45) Date of Patent: May 9, 2006

(54) PARALLEL MANUAL TRANSMISSION FOR FOUR-WHEEL DRIVE AND PARALLEL MANUAL TRANSMISSION FOR TRANSVERSE INSTALLATION IN A FRONT-WHEEL DRIVE VEHICLE

(75) Inventor: Burkhard Pollak, Buhl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 54 days.

(21) Appl. No.: 10/753,210

(22) Filed: Jan. 6, 2004

(65) Prior Publication Data

US 2004/0149080 A1 Aug. 5, 2004

(30) Foreign Application Priority Data

Jan. 9, 2003 (DE) ................. 103 00 423

(51) Int. Cl.
*F16H 3/08* (2006.01)
*B60K 17/34* (2006.01)
*B60K 17/354* (2006.01)

(52) U.S. Cl. ............... 74/330; 74/331; 180/240; 180/247

(58) Field of Classification Search .......... 74/330, 74/331, 335; 180/233–251
See application file for complete search history.

(56) References Cited

U.S. PATENT DOCUMENTS

| | | | | |
|---|---|---|---|---|
| 6,481,304 B1 * | 11/2002 | Yoshioka et al. | ............. | 74/335 |
| 6,634,247 B1 * | 10/2003 | Pels et al. | ............. | 74/329 |
| 6,712,725 B1 * | 3/2004 | Uchino | ............. | 475/119 |
| 6,780,135 B1 * | 8/2004 | Shibuya | ............. | 475/206 |
| 6,832,529 B1 * | 12/2004 | Shibuya | ............. | 74/331 |
| 2002/0178856 A1 * | 12/2002 | Oguri | ............. | 74/473.15 |

* cited by examiner

*Primary Examiner*—Tisha Lewis
(74) *Attorney, Agent, or Firm*—Darby & Darby

(57) ABSTRACT

A parallel manual transmission for a four-wheel drive is provided and includes two input shafts, each of which can be non-rotatably coupled via its own clutch to a shaft that is powered by a drive engine.

9 Claims, 8 Drawing Sheets

2 4 6 5 3 1 R

6 2 4 5 3 1 R 6 2 4 5 3 1 R

PARALLEL MANUAL TRANSMISSION FOR FOUR-WHEEL DRIVE AND PARALLEL MANUAL TRANSMISSION FOR TRANSVERSE INSTALLATION IN A FRONT-WHEEL DRIVE VEHICLE

FIELD OF THE INVENTION

The invention relates to a parallel manual transmission for four-wheel drive. The invention further relates to a parallel manual transmission, especially designed for transverse installation in a front-wheel drive vehicle.

BACKGROUND OF THE INVENTION

Parallel manual transmissions, also called twin-clutch transmissions, are drawing increasing interest because they enable the realization of an automatic transmission that can be operated without interruptions in propulsive power, are similar in design to a mechanical manual transmission, and have correspondingly low friction losses.

Ordinarily, four-wheel drive systems are designed such that a transfer case is connected to a manual transmission, such as a parallel manual transmission, and a drive shaft for the front axle extends outward from the transfer case, and parallel to the main gearbox, so that little space remains for actuation of the transmission and clutch, or for an optional electric motor. Having such little space presents a number of difficulties and therefore, it is desirable for a system to be designed with increased space.

SUMMARY OF THE INVENTION

The object of the invention is to modify the structure of a parallel manual transmission such that it is designed to correspond to given installation and drive requirements with narrow space requirements.

A solution to the object of the invention is attained with a parallel manual transmission for four-wheel drive that includes two input shafts, each of which can be non-rotatably coupled via its own clutch to a shaft that is powered by a drive engine; an output shaft that is radially distanced from the input shafts and parallel to them; gear wheels and shifting components arranged on the shafts, with which non-rotatable connections between the shafts can be made through different gear pairings for the purpose of shifting to different gears; a drive gear that is radially distanced from the output shaft and non-rotatably connected to a first output gear, which is arranged on the output shaft, and that is designed to power a first drive shaft, which extends outward from the drive gear in the direction of the clutches and is oriented parallel to the shafts of the transmission; and a second drive shaft that is powered by the output shaft and extends outward from the transmission on the side that is farthest from the clutches.

With the parallel manual transmission specified in the invention, the output for the front axle is positioned in the forward section of the transmission so that space for control elements and optionally an electric motor is available on the side next to the parallel manual transmission.

Advantageously, the second drive shaft is arranged coaxially with the input shafts, and meshes, by means of a gear wheel that is non-rotatably connected to the second drive shaft, with a second output gear that is positioned at the end of the output shaft that is farthest from the clutches.

In an embodiment of the parallel manual transmission, the first and/or the second drive gear is rigidly connected to the output shaft.

Also, in another embodiment of the parallel manual transmission, at least one of the first and the second drive gears meshes with a gear that is positioned on one of the input shafts, and that can be non-rotatably coupled with the allocated input shaft by means of a shifting component.

Selectability for the four-wheel drive system is easily achieved in that at least one of the drive shafts can be non-rotatably coupled with the parallel manual transmission by means of a shifting mechanism.

With the parallel manual transmission specified in the invention, an electric motor can be positioned advantageously on the side of the first drive gear that is farthest away from the clutches, and can be equipped with a pinion gear that meshes with a gear that is arranged on the output shaft.

In one embodiment of the parallel manual transmission specified in the invention, the first output gear is non-rotatably connected to the first drive gear by means of a belt mechanism.

In another embodiment, the first output gear meshes with the first drive gear.

Advantageously, at least one of the drive shafts is provided as a connection to a clutch that locks up with speed differences. In this manner, a four-wheel drive of the present invention provides reliable traction even over difficult terrain.

A further solution to the object of the invention is attained with a parallel manual transmission, designed especially for transverse installation in a front-wheel drive vehicle, that includes two input shafts, each of which can be non-rotatably coupled via its own clutch to a shaft that is powered by means of a drive engine; two output shafts that are radially distanced from and axially parallel to the input shafts; gear wheels arranged on the shafts; shifting components with which non-rotatable connections between the shafts can be made through different gear pairings, for the purpose of shifting to different gears; and output gears, each of which is non-rotatably connected to one of the output shafts, and which are in rotating engagement with a gear of a differential. With at least two gear ratio adjustments of the same gear wheel, each of the gears arranged on the input shafts meshes with one of the gears arranged on different output shafts.

Advantageously, the parallel manual transmissions specified in the invention are constructed such that the two clutches are designed as a twin clutch that can be flange-mounted on the drive engine, and is equipped with two individually actuated clutch disks. Each of the clutch disks is non-rotatably connected to one of the input shafts, which are arranged coaxially to one another, and one input shaft is designed as a hollow shaft while the other input shaft is designed to extend all the way inside the first.

In the embodiment of the parallel manual transmission that is specified in the invention for transverse installation in a front-wheel drive vehicle, two gear wheels are arranged on the inner input shaft that extends all the way through the hollow input shaft, with one of the gears being active in the first, third, and reverse gears, while the other is active in the fifth gear.

Below, the invention will be described by way of example and with additional details, with reference to the schematic drawings.

DETAILED DESCRIPTION OF THE INVENTION

Figure 1:
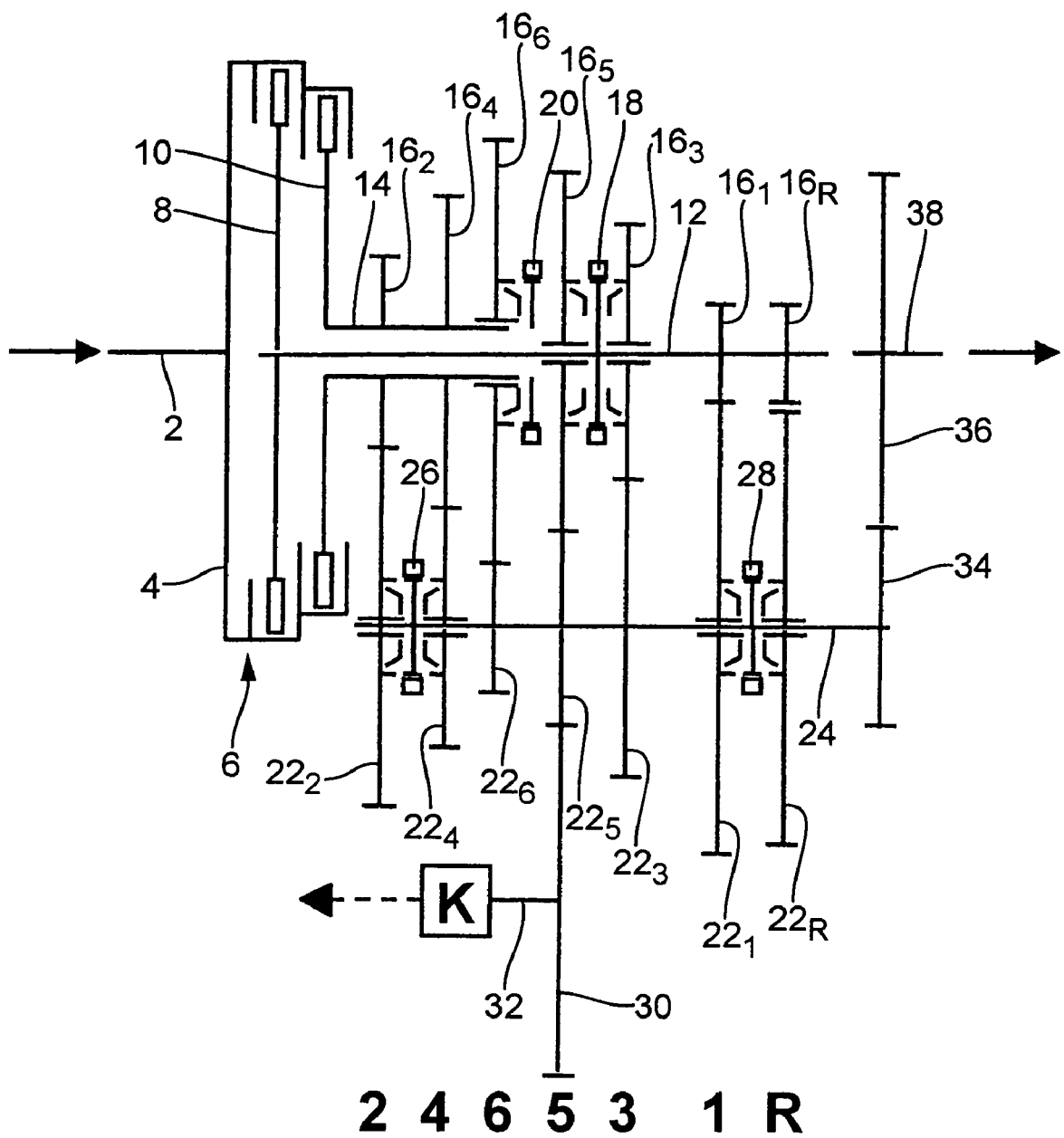
FIGS. 1–6 are sectional views of structures of parallel manual transmissions intended for four-wheel drive systems according to various embodiments of the present invention.

According to FIG. 1, a crankshaft 2 of an internal combustion engine, which is not shown here, is non-rotatably connected to the housing 4 of a twin clutch, the entirety of which is indicated here by the number 6. The twin clutch 6 includes two clutch disks 8 and 10, which can be brought into non-rotating engagement with the housing 4 via control elements that are not illustrated here. An input shaft 12 is non-rotatably connected to the clutch disk 8, and extends all the way through a further input shaft 14 that is designed as a hollow shaft and is non-rotatably connected to the clutch disk 10.

Pinion gears or gear wheels (gears) $16_1$ and $16_R$ are rigidly connected to the input shaft 12. Rotatably connected to the input shaft 12 are gears $16_5$ and $16_3$, which alternatively can be brought into non-rotating engagement with the input shaft 12 by means of a shifting mechanism 18.

The gears $16_2$ and $16_4$ are non-rotatably connected to the input shaft 14, which is designed as a hollow shaft. Further, a gear $16_6$ is supported on the input shaft 14, and can be brought into non-rotating engagement with the input shaft 14 by means of a shifting mechanism 20. The gears 16 mesh with gears $22_1$ through $22_R$, wherein the gears $22_6$, $22_5$, $22_3$ are rigidly connected to an output shaft 24 that is arranged parallel to the input shafts 12 and 14. The gears $22_2$, $22_4$, $22_1$ and $22_R$ are supported on the output shaft 24 and can be selectively brought into non-rotating engagement with the output shaft 24 by means of shifting mechanisms 26, 28.

The gear $22_5$, which forms an output gear, meshes with a drive gear 30, which is non-rotatably connected to a drive shaft 32, which is connected via a clutch K that locks up with speed differences, such as a viscous coupling, to a drive train of a vehicle that leads to the front wheels. The drive train is indicated here by a dashed line.

At the end of the output shaft 24 that is farthest from the twin clutch 6, a further output gear 34 is non-rotatably arranged and meshes with a gear wheel 36 that is positioned coaxially with the input shafts 12 and 14. The gear wheel 36 is non-rotatably connected to a drive shaft 38, which leads to the rear wheels of the vehicle.

The design and function of the twin clutch 6 and the shifting mechanisms 18, 20, 26 and 28 are known and thus will not be further detailed.

The gears indicated in FIG. 1 by numbers or letters, e.g., 2, 4, 6, 5, 3, 1 , and R, are engaged with the non-rotatable connection of the proper gears to the proper shafts by means of the shifting mechanisms. When a gear 2, 4, 6, 5, 3, 1, and R is engaged, the gear pairing, e.g., $16_2$ and $22_2$, $16_4$ and $22_4$, $16_6$ and $22_6$, $16_5$ and $22_5$, $16_3$ and $22_3$, $16_1$ and $22_1$, and $16_R$ and $22_R$, that is shown above the corresponding number or letter, indicates the non-rotating connection between the output shaft 24 and one of the two input shafts 14 and 12.

As is clearly apparent from FIG. 1, the output for the front axle at the height of the center or forward area of the twin-clutch transmission, which ordinarily is installed lengthwise in the vehicle, is angled toward the front, and the drive for the rear wheels follows toward the rear coaxially to the input shafts. Therefore, space is available on the side and at an angle behind the twin-clutch transmission to accommodate control elements for the clutches and the shifting mechanisms. Alternatively, the present invention can include a manual transmission that is controlled by means of a transmission actuator with active interlock.

Figure 2:
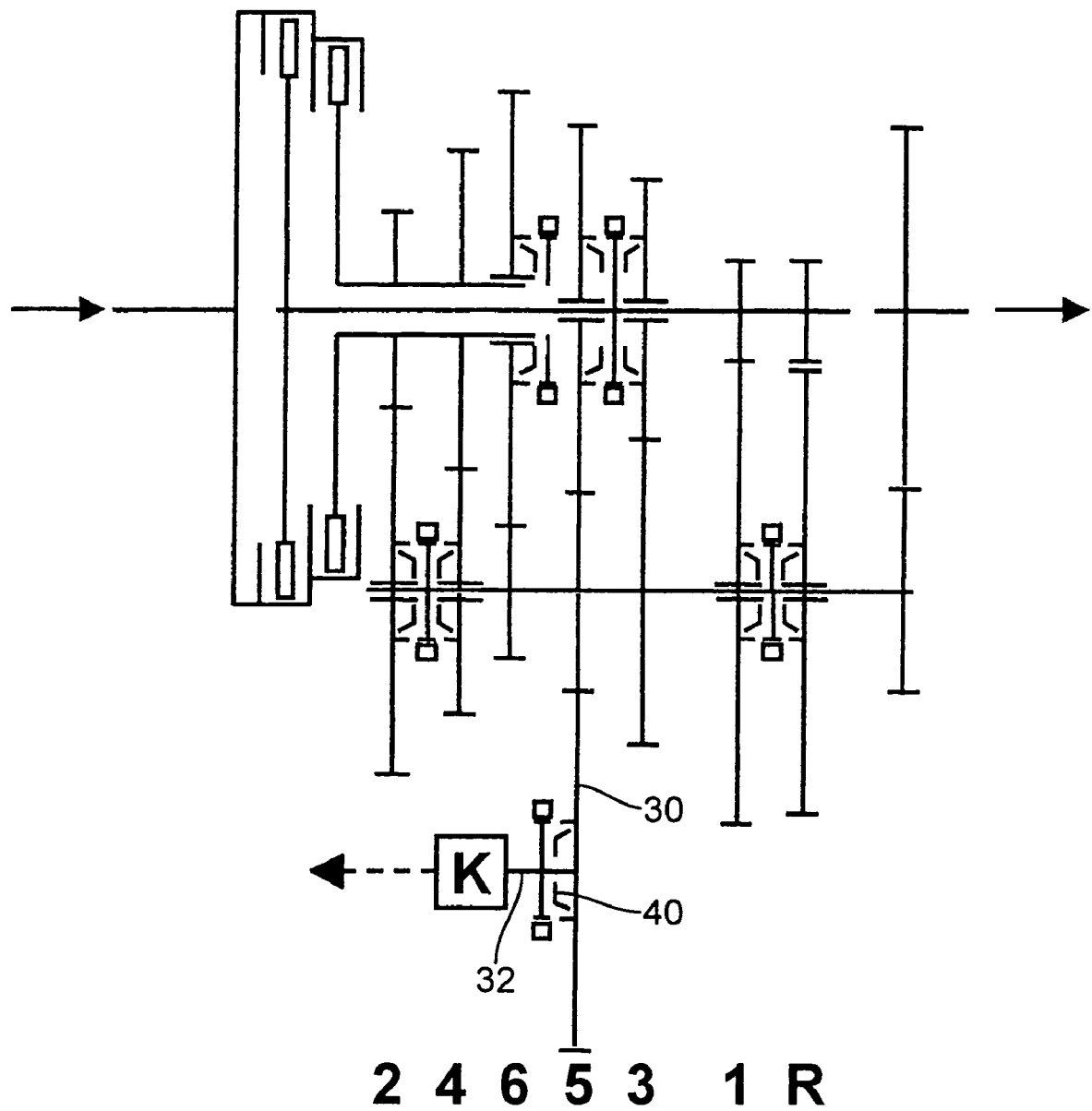

FIG. 2 shows an embodiment of the twin-clutch transmission that is modified slightly from that of FIG. 1, with only the portion that has been modified from FIG. 1 being indicated by reference numbers. In the embodiment shown in FIG. 2, the drive shaft 32 that leads to the front wheels can be non-rotatably coupled to the drive gear 30 by means of a shifting mechanism 40 so that the front-wheel drive can be completely disengaged.

It is understood that different gear ratio adjustments for the front-wheel drive and the rear-wheel drive systems are offset by means of suitable final drives for the front axle and the rear axle. It is further understood that when the reverse gear is engaged a secondary gear between the gears $16_R$ and $22_R$ is active.

Figure 3:
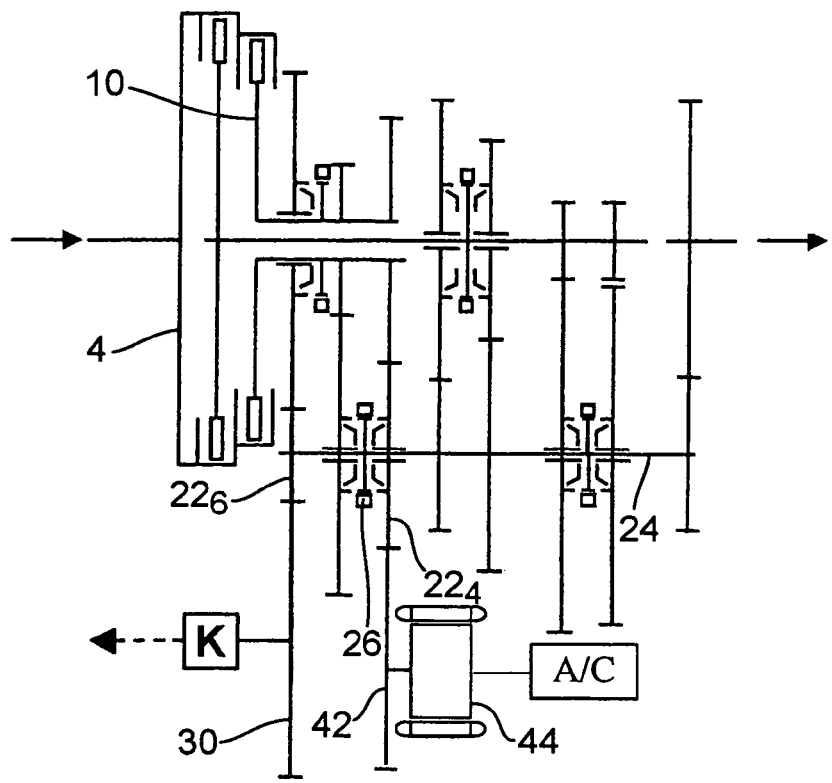

FIG. 3 shows a further embodiment of the twin-clutch transmission, modified from that of FIG. 1, in which the series of gears 2, 4 and 6 has been changed, and the output gear 30 for the front-wheel drive meshes with the gear $22_6$ of the sixth gear, which is non-rotatably connected to the output shaft 24. In this manner, the output for the front-wheel drive to the twin-clutch transmission is displaced further toward the front, creating additional structural space in which a further gear wheel 42 is positioned. The gear wheel 42 meshes with the gear $22_4$, which can be non-rotatably coupled with the output shaft 24 by means of the shifting mechanism 26. The gear 42 forms the pinion gear of an electric motor 44, such as a starter generator, via which the engine can be started when the clutch disk 10 is engaged with the clutch housing 4, and which can be installed as a generator for charging a battery.

Figure 4:
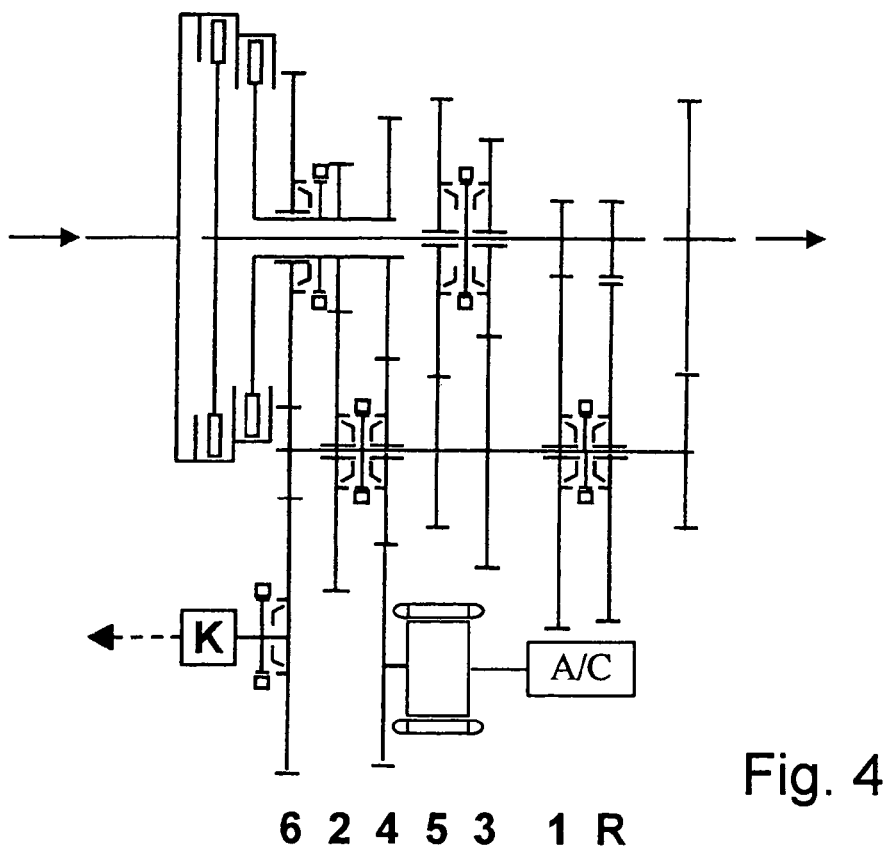

The embodiment shown in FIG. 4 combines the characterizing features of FIG. 2 and 3, in that the front-wheel drive can be engaged and disengaged by means of the shifting mechanism.

Figure 5:
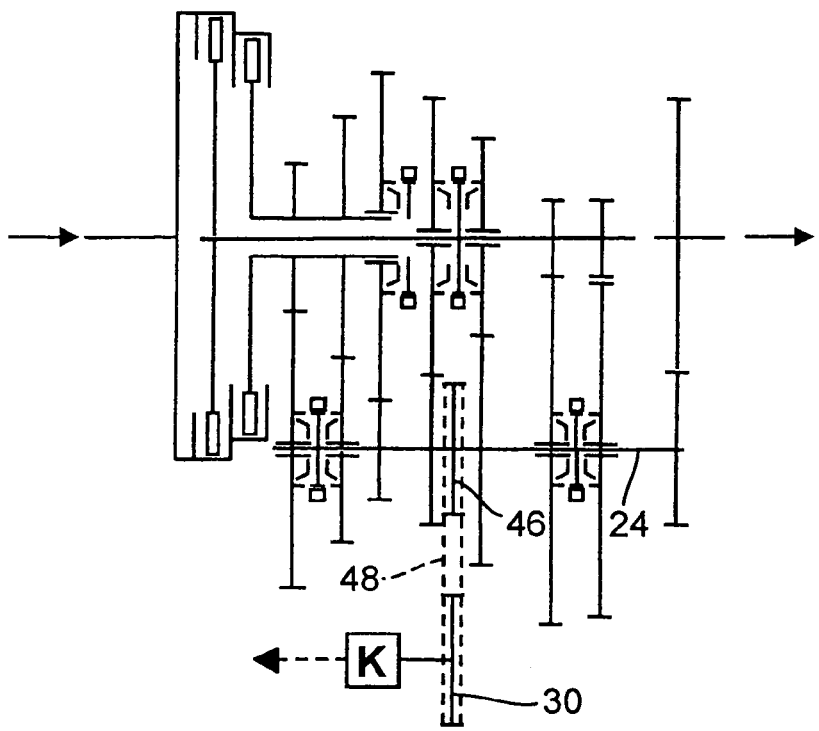

The embodiment shown in FIG. 5 differs from that of FIG. 1 in that the drive gear 30 for the front-wheel drive does not mesh directly with the gear $22_5$, but is non-rotatably connected to the output shaft 24 of a further gear 46. The gear 46 is connected to the drive gear 30 via a chain, a belt, or some other wraparound system 48.

Figure 6:
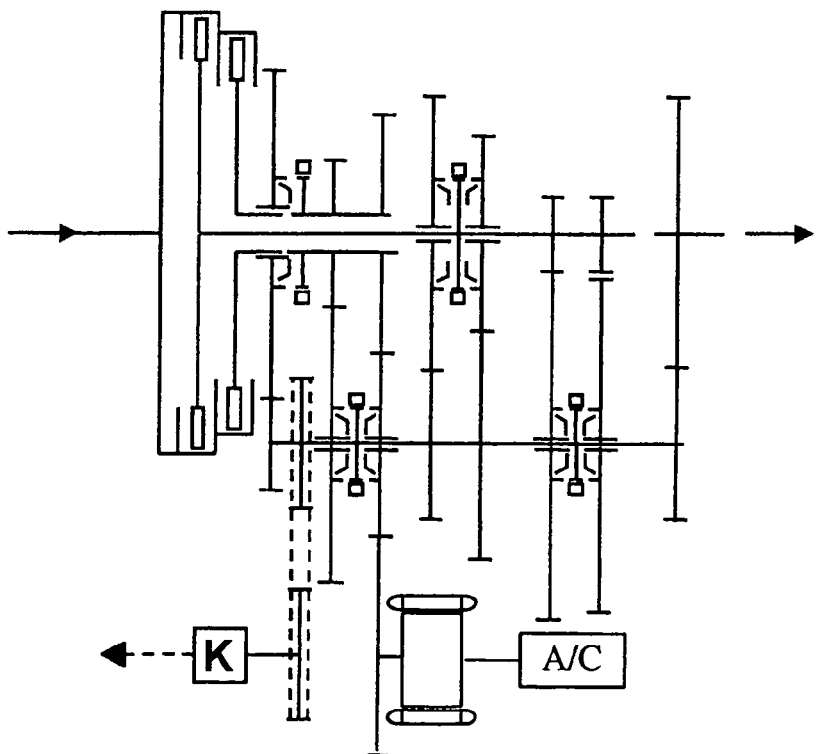

The embodiment of the twin-clutch transmission shown in FIG. 6 combines characterizing features of FIG. 3 and 4 with those of FIG. 5.

It is understood that the described embodiments of the twin-clutch transmission can be modified in a multitude of ways. For example, it is not required that the input shafts be arranged coaxially to one another, rather the input shafts can be connected via their own clutches and secondary gears to the crankshaft of the internal combustion engine. Furthermore, the installation of the twin-clutch transmission can be such that the front axle and rear axle drives are transposed, in which case the drive shaft 38 need not be coaxially arranged with the input shafts or with one of the input shafts. The gear pairings, the shifting mechanisms and the combined operation with the electric motor can be modified in that the number of gears may be larger or smaller, the electric motor may be used as a supplement to the drive system or to provide additional torque in individual gears, etc.

Figure 7:
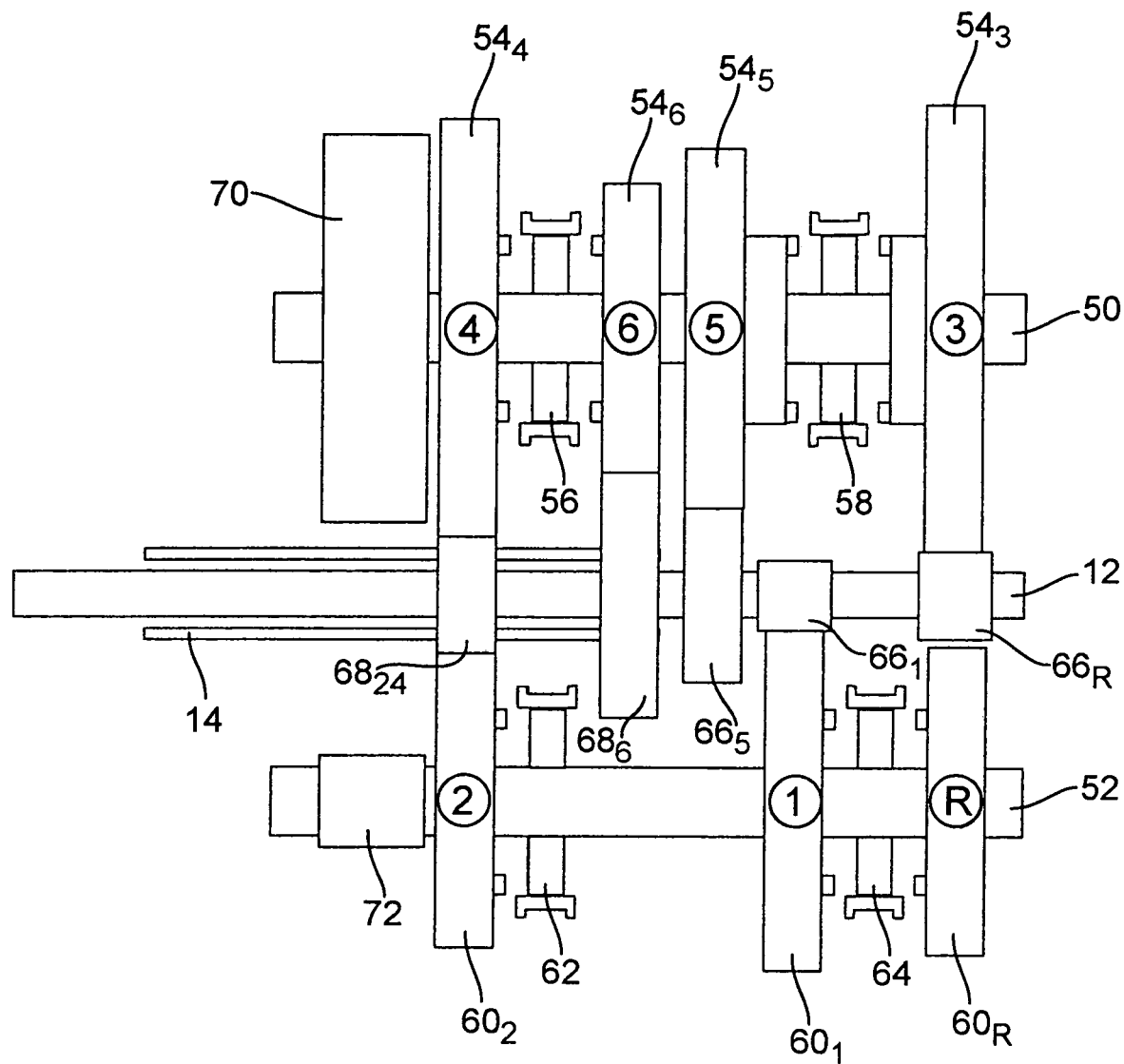
FIGS. 7–9 are sectional views of structures of parallel manual transmissions intended for transverse installation and front-wheel drive systems according to various embodiments of the present invention.

FIG. 7 shows a modified embodiment of a twin-clutch transmission, in which again one input shaft 12 extends all the way through the other input shaft 14, which is designed as a hollow shaft. The arrangement of the twin clutch is not shown in FIG. 7 and corresponds to that of FIG. 1. In contrast to the embodiment shown in FIG. 1, the twin-clutch transmission shown in FIG. 7 has two output shafts 50 and 52, wherein gears 54 are supported on the output shaft 50, and can selectively be non-rotatably coupled with the output shaft 50 by means of shifting mechanisms 56 and 58.

Gears $60_2$, $60_1$, $60_R$ are supported on the output shaft 52, and can selectively be non-rotatably coupled with the output shaft 52 by means of shifting mechanisms 62 and 64.

Pinion gears or gears $66_5$, $66_1$ and $66_R$ are permanently, non-rotatably connected to the input shaft 12, wherein the gear $66_5$ meshes with the gear $54_5$, the gear $66_1$ meshes with the gear $60_1$, and the gear $66_R$ meshes with the gear $60_R$.

Gears $68_{24}$ and $68_6$ are non-rotatably connected to the input shaft 14, wherein the gear $68_{24}$ permanently meshes with the gears $60_2$ and $54_4$, and the gear $68_6$ meshes with the gear $54_6$.

As is clearly apparent from FIG. 7, with the proper actuation of the shifting mechanisms 56, 58, 62 and 64, the corresponding gears 54 or 60 can be non-rotatably coupled with the output shafts 50 and 52, so that the gears 4, 6, 5, 3, 2, 1, R indicated by the reference numbers inside the circles are engaged. The gear $68_{24}$ is used for the fourth gear and for the second gear. The transfer of torque from the output shafts 50 and 52 to, for example, a front wheel is accomplished via an output gear 70 that is non-rotatably connected to the output shaft 50 at its end that is nearest the twin clutch, and via an output gear 72 that is non-rotatably connected to the output shaft 52 at its end that is nearest the twin clutch. The output gears 70 and 72 mesh with a gear of a front differential that is not illustrated here.

The transmission shown in FIG. 7 is particularly well suited for transverse installation in front-wheel drive vehicles, in which the front differential, for example, is positioned below the drive gears 70 and 72. It is characterized by a short overall length, due to the four shafts and the dual use of the gear $68_{24}$ for two gears in the example shown here. Both the first and the reverse gears are advantageously allocated to the inner input shaft 12, which is connected to the larger clutch disk.

Figure 8:
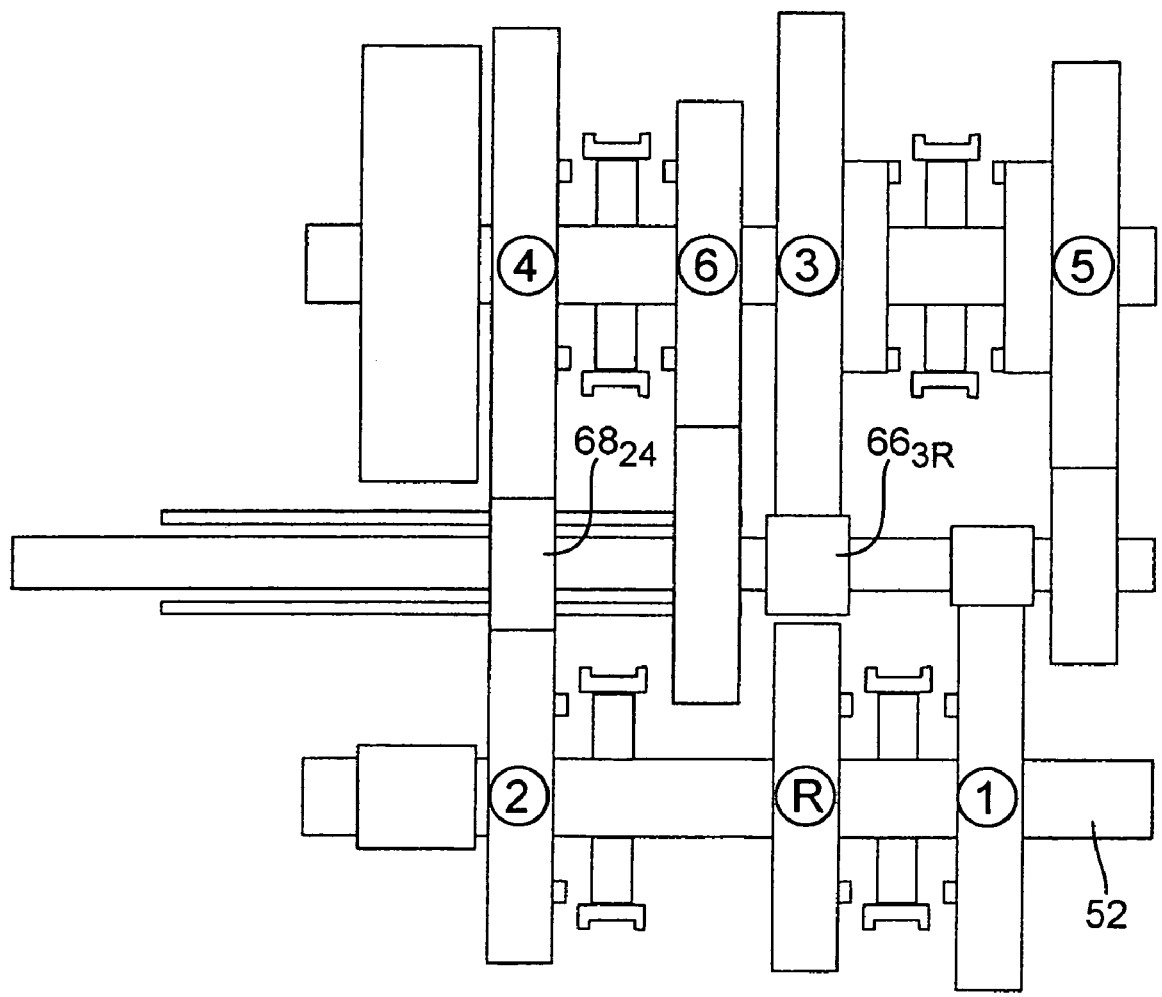

FIG. 8 illustrates an embodiment for the twin-clutch transmission that is modified over that of FIG. 7, wherein the uneven gears 3, 1 and 5 are positioned differently. In the embodiment shown in FIG. 8, a parking lock gear can be positioned on the right end of what in the drawing is the lower output shaft 52. In the embodiment shown in FIG. 7, the parking lock gear can be advantageously positioned in the center area of the output shaft 52.

Figure 9:
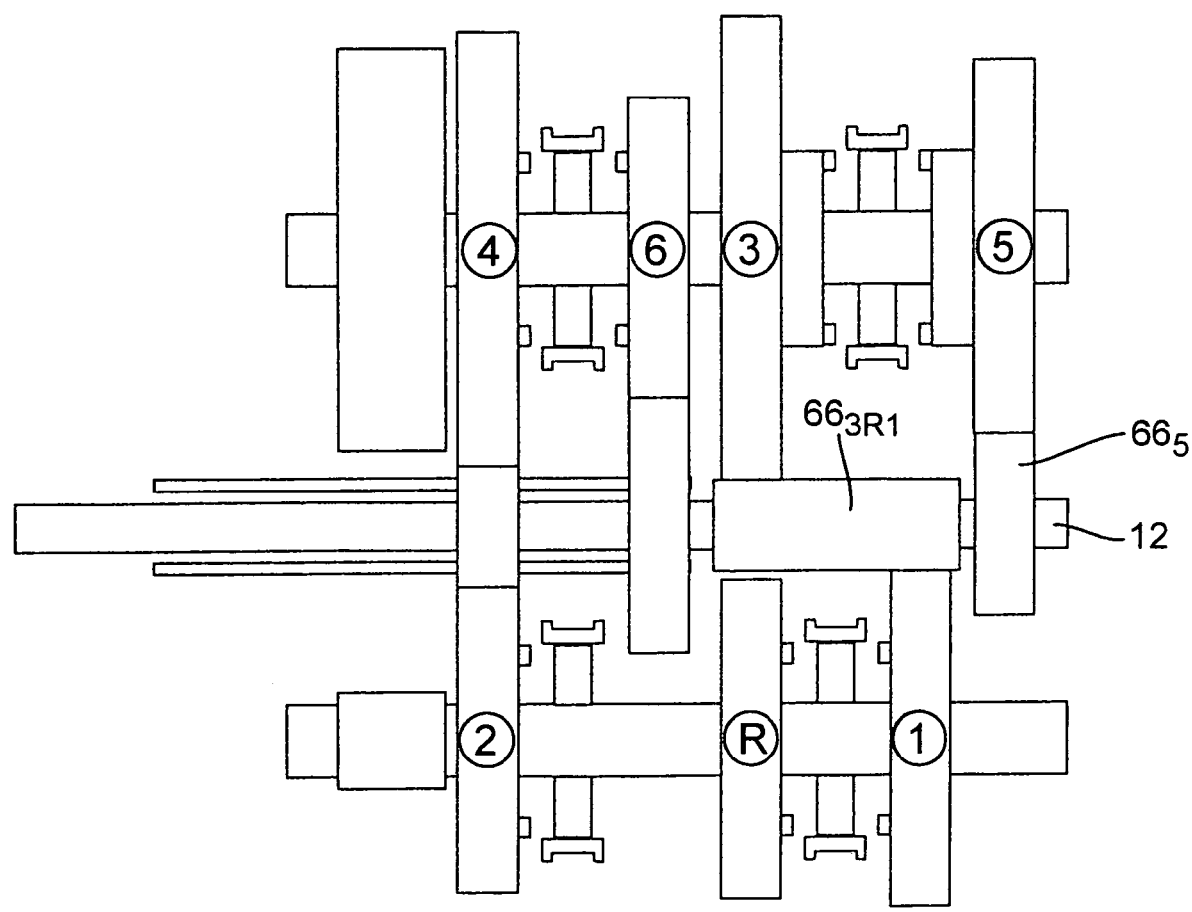

The embodiment shown in FIG. 9 differs from that of FIG. 7 in that only two pinion gears or gears $66_{3R1}$ and $66_5$ are positioned on the input shaft 12, wherein the gear $66_{3R1}$ is used for the $1^{st}$, $3^{rd}$, and reverse gears (gears 1, 3, and R), resulting in a forced condition for the first gear. The jump in gears between the $1^{st}$ and $3^{rd}$ gears corresponds to that between the $2^{nd}$ and $4^{th}$ gears. The gearing for the gears R, 1 and 3 on the gear $66_{3R1}$ is relatively long axially, but can be cut directly onto the shaft 12 in one process step, which is advantageous in terms of production technique.

Figure 10:
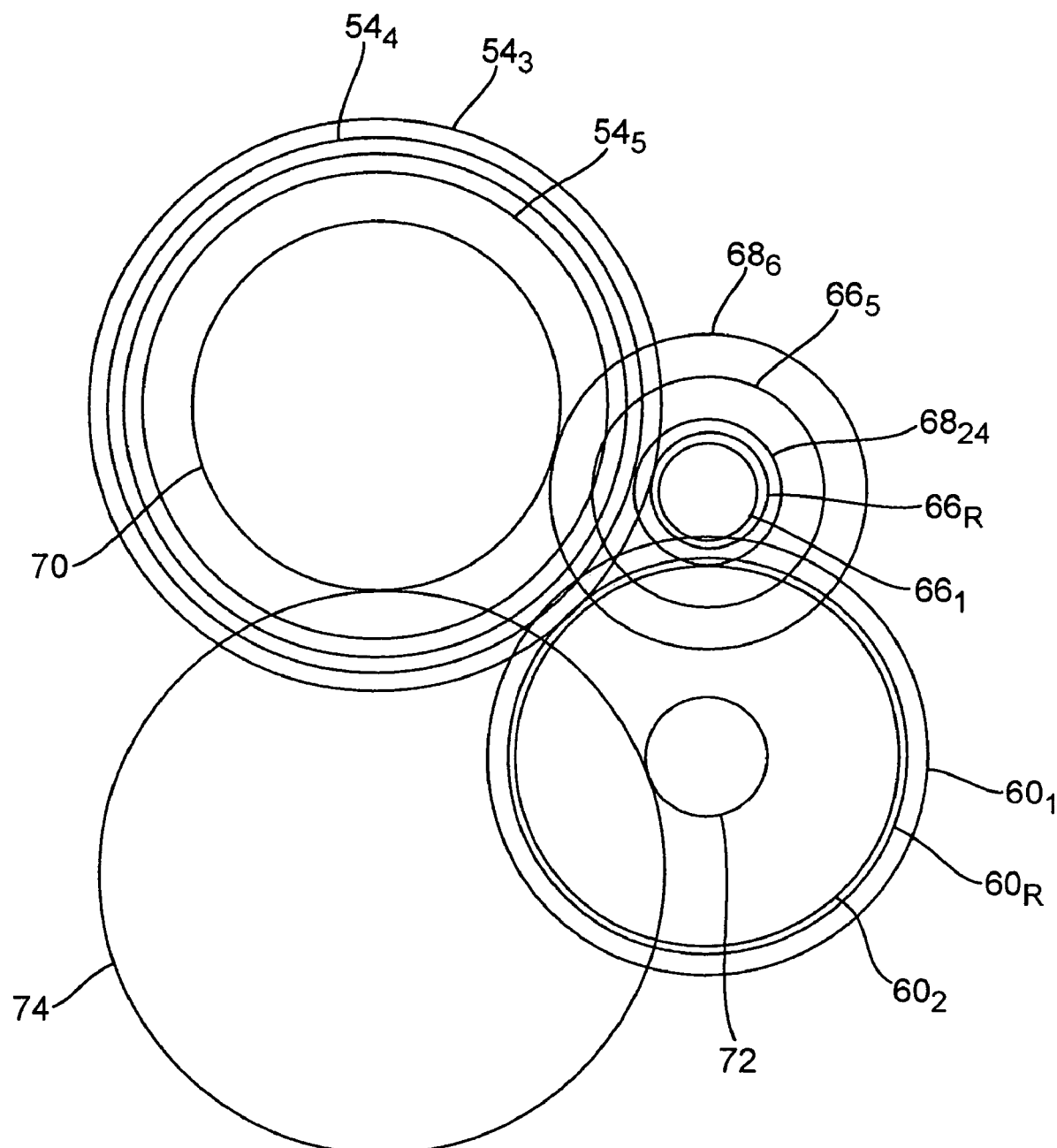
FIG. 10 is a frontal view of the transmission shown in FIG. 7, showing the contours of the different gears.

FIG. 10 shows, in a frontal view of FIG. 7, the outlines or diameters of the different gears, wherein the gear of the differential is indicated by the number 74.

As is apparent, the arrangement is very compact in structure, and despite the use of multiple gear wheels for different gears, a progressive gear ratio is possible. The gear ratio adjustment of the reverse gear advantageously lies between the gear ratio adjustments of the first and the second gears, as is customary.

It is understood that the twin-clutch transmission shown in FIG. 7 through 9, which is used advantageously for transverse installation in front-wheel drive vehicles, can be modified in various ways by using more or fewer gear wheels and shifting mechanisms, and by using different allocations, wherein all embodiments share the common feature that at least one gear wheel or pinion gear of one of the input shafts is used for the engagement of various gears.

It is further understood that characterizing features of the embodiments shown in FIG. 7 through 9 can be combined with those of the embodiments shown in FIG. 1 through 6.

The following patent claims are proposed formulations, without prejudice to obtaining further patent protection. The applicant reserves the right to claim additional characterizing features that up to now have been disclosed only in the description and/or the drawings. References used in the sub-claims refer to the further development of the object of the main claim through the characterizing features of that sub-claim; they are not to be understood as a waiver to obtaining independent protection for the combination of characterizing features contained in the sub-claims. Because the objects of the sub-claims can represent objective and independent inventions on the priority date with respect to the state of the art, the applicant reserves the right to make them the object of independent claims or declarations of division. They may also contain independent inventions, the form of which is independent from the objects of the preceding sub-claims.

The exemplary embodiments are not to be understood as a restriction of the invention. Rather, within the scope of the present disclosure, numerous changes and modifications are possible, especially such variants, elements, and combinations that, for example, can be arrived at by an expert in the field by modifying individual features or elements or process steps described in connection with those of the general description and embodiments, and the claims, and contained in the drawings, with respect to the attainment of the object or the achievement of advantages, and that lead to a new object or to new process steps or process sequences as a result of combinable characterizing features.

I claim:

1. A parallel manual transmission for a four-wheel drive system comprising: two input shafts connected to two clutches which are disposed in a single housing, each of the input shafts can be non-rotatably coupled via the respective clutch to a shaft that is powered by a drive engine, an output shaft that is radially distanced from the input shafts and arranged parallel to the input shafts, gear wheels and shifting components arranged on the input shafts and the output shaft, the gear wheels can be non-rotatably connected to the input shafts and the output shaft through different gear pairings for shifting to different gears, a drive gear that is radially distanced from the output shaft and non-rotatably connected to a first output gear, which is arranged on the output shaft, the drive gear being designed to power a first drive shaft, which extends outward from the drive gear in the direction of the clutches and is oriented parallel to the input shafts and the output shaft of the transmission, and a second drive shaft that is powered by the output shaft and extends outward from the transmission on a side that faces away from the clutches, wherein each of the two input shafts has a plurality of gears which are in cooperative connection with the same output shaft to form different transmission ratios.

2. The parallel manual transmission pursuant to claim 1, wherein the second drive shaft is arranged coaxially with the input shafts and meshes, by means of a gear wheel that is non-rotatably connected to the second drive shaft, with a second output gear that is positioned at an end of the output shaft that is farthest from the clutches.

3. The parallel manual transmission pursuant to claim 2, wherein at least one of the first and the second output gears is rigidly connected to the output shaft.

4. The parallel manual transmission pursuant to claim 2, wherein at least one of the first and second output gears meshes with a gear wheel that is arranged on one of the input shafts and that can be non-rotatably coupled by means of a shifting component to the allocated input shaft.

5. The parallel manual transmission pursuant to claim 1, wherein at least one of the first and the second drive shafts can be non-rotatably coupled to the parallel manual transmission by means of a shifting mechanism.

6. The parallel manual transmission pursuant to claim 1, wherein an electric motor is positioned on a side of the first output gear that is farthest from the clutches, and the electric motor is equipped with a pinion gear that meshes with a gear wheel that is arranged on the output shaft.

7. The parallel manual transmission pursuant to claim 1, wherein the first output gear is non-rotatably connected to the drive gear via a belt mechanism.

8. The parallel manual transmission pursuant to claim 1, wherein the first output gear meshes with the drive gear.

9. The parallel manual transmission pursuant to claim 1, wherein at least one of the first and the second drive shafts is provided for connecting to a clutch that locks up with speed differences.

* * * * *